(No Model.)

S. M. SCHINDEL.
HARNESS.

No. 557,432.  Patented Mar. 31, 1896.

Witnesses:
A. R. Appleman Jr.
C. C. Jones.

Inventor:
Samuel M. Schindel.
By: Chas J. Gooch
Attorney

UNITED STATES PATENT OFFICE.

SAMUEL M. SCHINDEL, OF HAGERSTOWN, MARYLAND.

HARNESS.

SPECIFICATION forming part of Letters Patent No. 557,432, dated March 31, 1896.

Application filed August 22, 1895. Serial No. 560,127. (No model.)

*To all whom it may concern:*

Be it known that I, SAMUEL M. SCHINDEL, a citizen of the United States, residing at Hagerstown, in the county of Washington and State of Maryland, have invented certain new and useful Improvements in Harnesses; and I do hereby declare the following to be a full, clear, and exact description of the invention, such as will enable others skilled in the art to which it appertains to make and use the same.

This invention relates to improvements in track-harnesses employed in speeding horses, whereby a harness of few parts, simple and inexpensive construction, and ready application is produced, and by means of which the horse is compelled to trot, is largely prevented from kicking and hopping or sidewise movement, and from breaking or running, the chafing of the legs of the horse through contact of the harness therewith is avoided, and the free and easy movement of the muscles of the horse is unimpeded.

Figure 1:
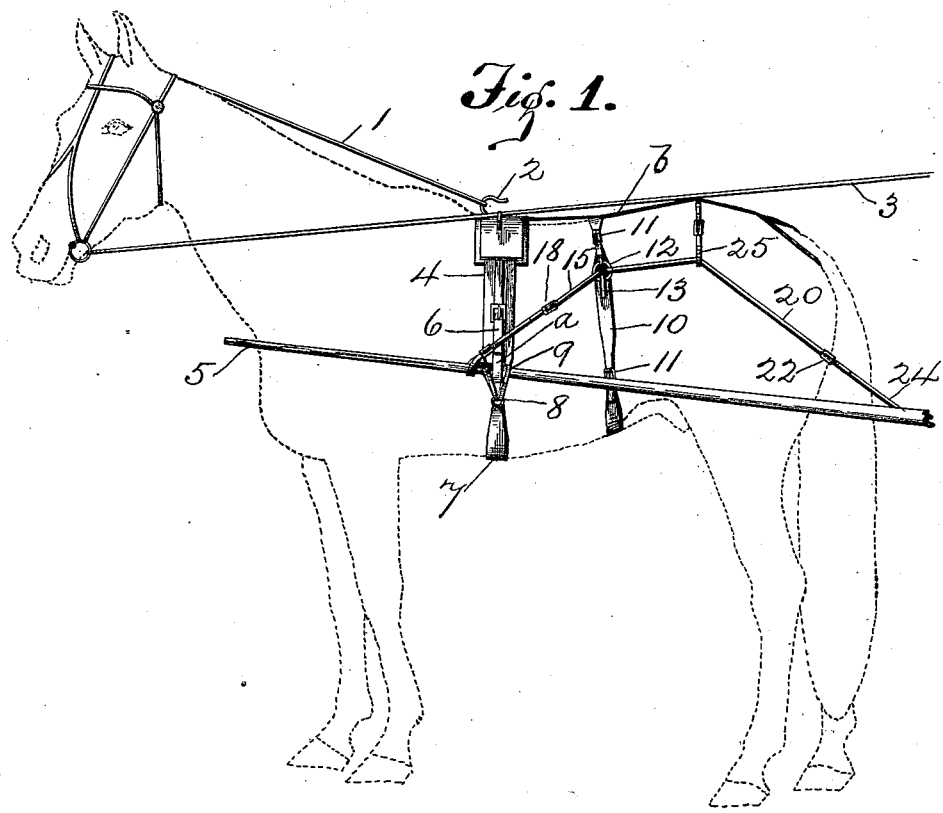
Figure 2:
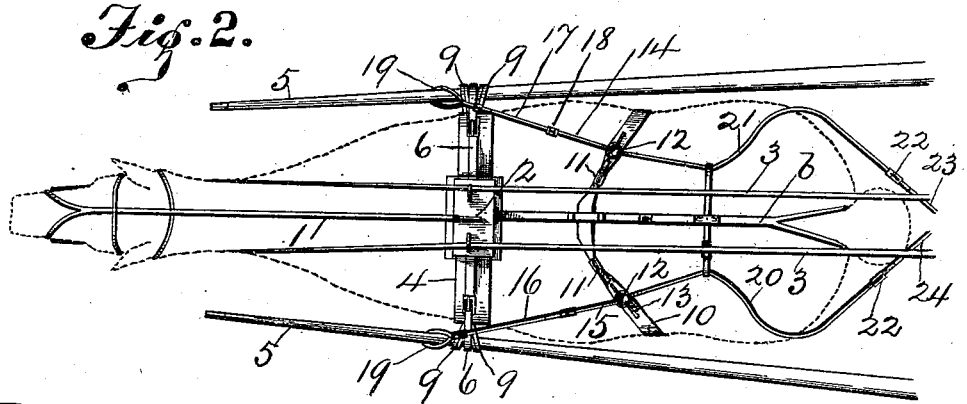

In the accompanying drawings, Figure 1 represents, in side elevation, my improved harness in position upon a horse. Fig. 2 represents a top plan view thereof.

1 represents the check-strap, 2 the check-strap hook, 3 the reins, 4 the saddle, 5 the thills, and 6 the saddle and thill connecting straps, all of which may be of usual construction.

7 represents the belly-girth, which at its ends has buckles or other connecting devices 8.

9 represents a pair of straps connecting the thills and the ends of the belly-girth. These straps each have end connection with the girth, and from thence are passed around or encircle one or more times the thills adjacent to one edge of the thill-tug $a$, and then over the thills adjacent to the other edge of said tug, thereby straddling said tugs, the free ends of said straps being secured by buckle or other suitable known device.

10 represents a supplemental girth, which passes through the crupper-strap $b$ in a position to encircle the body of the horse at the point shown, so as to afford supports on each side for the sectional trace-straps, buckles, as 11, serving to adjustably secure said supplemental girth in position. 12 represents rings or their equivalent secured to the upper portion of the respective sides of this girth 10 by tongues 13 or other suitable means.

The trace-straps are constructed in sections adjustably connected together by buckle adjustment or otherwise to admit of the said straps being either lengthened or shortened to suit different horses and to regulate the tension or draft strain thereon and controlling influence thereof. Of these trace-straps, one on each side, as shown in Fig. 2, 14 15 represent a pair of front straps sewed or otherwise connected at their rear ends with the rings 12, and in use extending angularly forward and downward therefrom, as shown in Fig. 1.

16 17 represent a pair of angularly-disposed straps adjustably connected at 18 to the front ends of the straps 14 15 and having loop or other connection 19 with the thills immediately in front of the thill-tugs $a$, by which construction and arrangement less material is used than were the trace connection at the front of the thills. They can, therefore, be more economically constructed and more readily placed in and removed from position and the adjustment of said sections relatively to each other readily secured.

20 21 represent a pair of rearwardly-extending straps attached at their front ends to said rings 12 and extending angularly rearward and downward, their rear ends having adjustable connection by buckles 22 or otherwise with the front ends of angularly-extending straps 23 24, whose rear ends are attached to the vehicle. (Not shown.)

25 represents a suspensory strap, which is passed through a loop in the crupper-strap $b$ and has adjustable connections, by buckles or otherwise, with the rear straps 20 21, so as to regulate the degree of suspension thereof and maintain the said trace-straps in a position of pressure across the hips and above the line of the articulatory movement of the horse, so as not to interfere with the free and easy movement of the muscles. By thus elevating the trace-straps and maintaining them at the angular inclination shown the legs of the horse are relieved from all possibility of friction thereon, while by extending them in contact with and around the hips and with their ends secured to the vehicle, as indicated in Fig. 2, said hips are clasped in such a manner as not only to effectually prevent hitching or hopping, but also to compel the horse to trot squarely, said straps serving as kicking-straps, gaiting-pole, or side lines.

Having thus described my invention, what I claim is—

1. A harness comprising the saddle, a belly-girth, depending looped straps to receive the thills, straps encircling the thills and straddling the thill-tugs and connecting the belly-girth and saddle, a back-band or crupper-strap, trace-straps each composed of a pair of adjustably-connected front sections and a pair of adjustably-connected rear sections, said straps connecting at their front ends with the thills adjacent to and forwardly of the thill-tugs and at their rears with the vehicle, a supplemental girth and suspensory devices carried, respectively, by said supplemental girth and by the crupper-strap and connected with and adapted to support the trace-straps above the line of articulation of the rear of the horse, substantially as and for the purpose set forth.

2. An attachment to track-harness, consisting of a supplemental girth connected with the back-band or crupper-strap and adapted to encircle the horse, a pair of trace-straps each consisting of a pair of adjustably-connected straps extending diagonally forward and downward from said supplemental girth to the thills, and a pair of adjustably-connected straps extending diagonally rearward and downward from said girth to the vehicle, and suspensory devices connected, respectively, with said girth and with the back-band and also with the trace-straps and suspending said trace-straps above the line of articulatory movement of the horse, substantially as and for the purpose set forth.

3. An attachment to track-harness, consisting of a supplemental girth to encircle the horse, rings secured to said sectional girth, trace-straps each consisting of a pair of buckled or similarly adjustably-connected front straps extending angularly of and connecting, respectively, with the thills and with one of the rings on said girth and a sectional pair of buckled or similarly adjustably-connected and rearwardly and downwardly extending straps, each connected, respectively, with one of the rings on said girth and with the vehicle, and adjustable suspensory straps depending from the crupper-strap and adjustably connecting said rear straps and the crupper-strap adjacent to the thighs of the horse and suspending said trace-straps above the line of articulation of the rear portion of the horse, substantially as and for the purpose set forth.

In testimony whereof I affix my signature in presence of two witnesses.

SAMUEL M. SCHINDEL.

Witnesses:
CHAS. J. GOOCH,
L. P. WHITAKER.